(12) United States Patent
Yang

(10) Patent No.: US 8,721,512 B2
(45) Date of Patent: May 13, 2014

(54) TOOL MAGAZINE DEVICE FOR A MACHINE TOOL

(75) Inventor: Yi-Chen Yang, Tainan (TW)

(73) Assignee: Arix CNC Machine Inc., Tainan (TW)

( * ) Notice: Subject to any disclaimer, the term of this patent is extended or adjusted under 35 U.S.C. 154(b) by 498 days.

(21) Appl. No.: 13/134,717

(22) Filed: Jun. 15, 2011

(65) Prior Publication Data

US 2012/0172185 A1   Jul. 5, 2012

(30) Foreign Application Priority Data

Jan. 3, 2011   (TW) .............................. 100100059 A

(51) Int. Cl.
*B23Q 3/157*   (2006.01)

(52) U.S. Cl.
USPC ......... 483/13; 483/3; 483/12; 483/55; 483/58

(58) Field of Classification Search
CPC ........... B23Q 3/15506; B23Q 3/15546; B23Q 3/15566; B23Q 3/15706; B23Q 11/005
USPC ........................................ 483/2, 3, 13, 54–69
See application file for complete search history.

(56) References Cited

U.S. PATENT DOCUMENTS

| | | | |
|---|---|---|---|
| 4,404,728 A * | 9/1983 | Ishikawa | 483/13 |
| 4,658,493 A * | 4/1987 | Saeki et al. | 483/66 |
| 7,172,542 B2 * | 2/2007 | Sato et al. | 483/1 |

FOREIGN PATENT DOCUMENTS

JP          06218646 A  *  8/1994  ............. B23Q 3/157

* cited by examiner

*Primary Examiner* — Andrea Wellington
*Assistant Examiner* — Michael Vitale
(74) *Attorney, Agent, or Firm* — Holland & Hart LLP

(57) ABSTRACT

A tool magazine device includes a magazine body adapted to be disposed on a machine body of a machine tool to confront a working space, a plurality of insertion openings formed in a right side wall of the magazine body and each extending towards a left side wall of the magazine body to form a storage chamber, a plurality of gripping members fitted in the insertion openings for grippingly engage cutting tools, an inlet disposed in the magazine body for introducing therein a flow of pressurized air, and an air duct unit disposed on the left side wall and coupled to communicate the inlet with the storage chambers so as to permit the pressurized air to flow out of the insertion openings to thereby clean swarf from the cutting tools.

12 Claims, 5 Drawing Sheets

US 8,721,512 B2

TOOL MAGAZINE DEVICE FOR A MACHINE TOOL

CROSS-REFERENCE TO RELATED APPLICATION

This application claims priority of Taiwanese Patent Application No. 100100059, filed on Jan. 3, 2011, the disclosure of which is herein incorporated by reference.

BACKGROUND OF THE INVENTION

1. Field of the Invention

This invention relates to a machine tool, more particularly to a tool magazine device for a machine tool.

2. Description of the Related Art

In a machine tool, a workpiece is machined successively by a variety of cutting tools that are held by a magazine or turret. A transport device, such as a robotic arm, is employed to remove and place a cutting tool through programmed control. There is a high possibility that swarf produced by cutting of a workpiece is adhered to the cutting tools. If the swarf is adhered to a contact surface of the tool which is to be brought into contact with a spindle by the transport device, the tool may not be properly fitted to the spindle. There is a well-known method in which an openable cover is mounted on the magazine for shielding the cutting tools from flying swarf, and is opened when a tool change process is performed to allow the transport device to enter the magazine. However, such construction of the magazine is bulky and foreign matters might enter the magazine during the tool change process and adhere to the cutting tools.

SUMMARY OF THE INVENTION

An object of the present invention is to provide a tool magazine device which is capable of cleaning cutting tools immediately before storage thereof so as to avoid adhering swarf to the cutting tools.

According to this invention, the tool magazine device includes a magazine body adapted to be disposed on a machine body to confront a working space, and having outer and inner mounting walls opposite to each other, and left and right side walls which are distal from and proximate to a tool spindle, respectively. The right side wall has a plurality of insertion openings displaced from each other, and each extending towards the left side wall along an insertion axis to form a storage chamber that terminates at an abutment. An inlet is disposed in the magazine body for introducing therein a flow of pressurized air. An air duct unit is disposed on the left side wall and coupled to communicate the inlet with the storage chambers so as to permit the pressurized air to flow out of the insertion openings to thereby clean swarf from the cutting tools when the respective cutting tool is inserted into the corresponding insertion opening.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
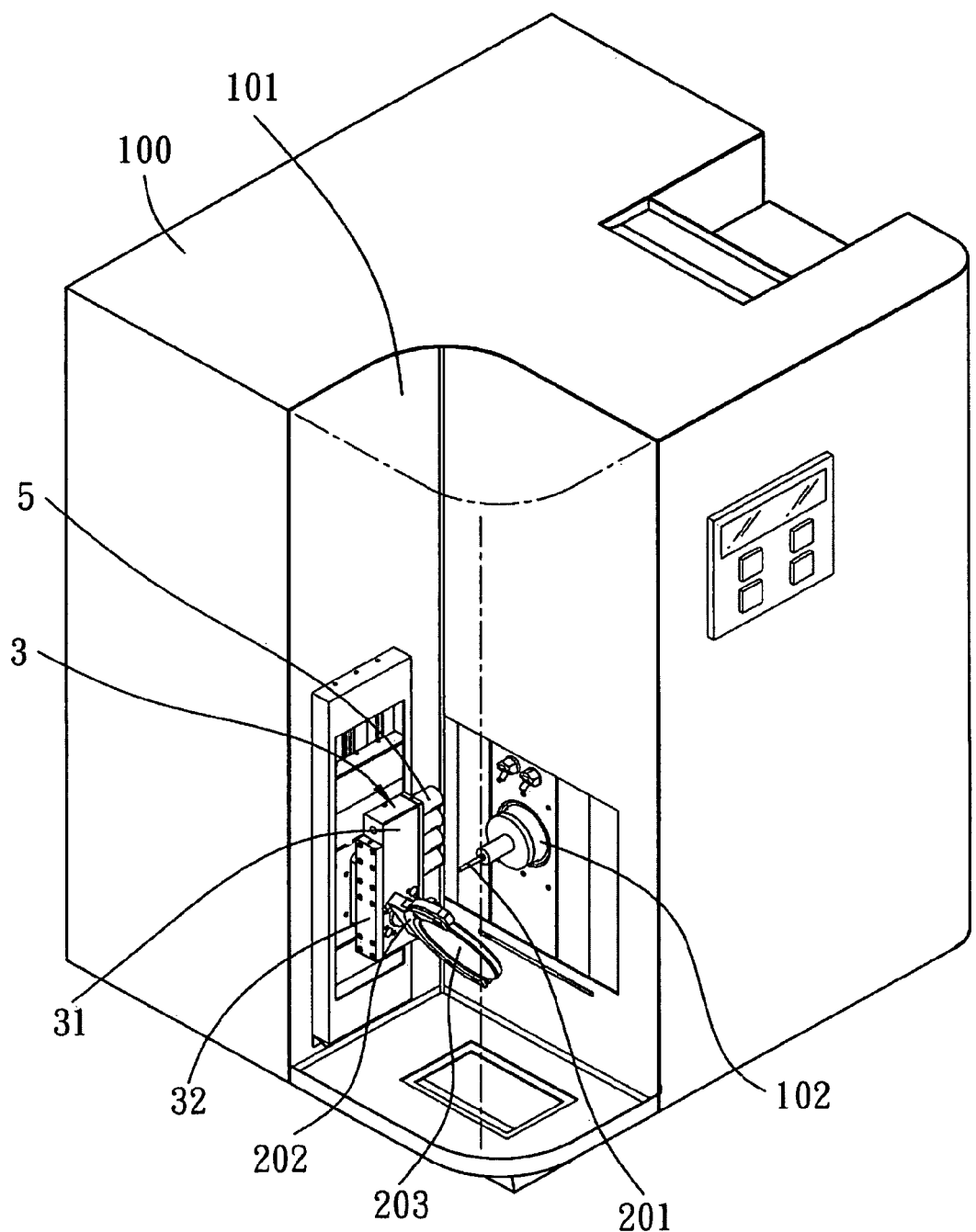
FIG. 1 is a perspective view of the preferred embodiment of a tool magazine device incorporated in a machine tool.
Figure 2:
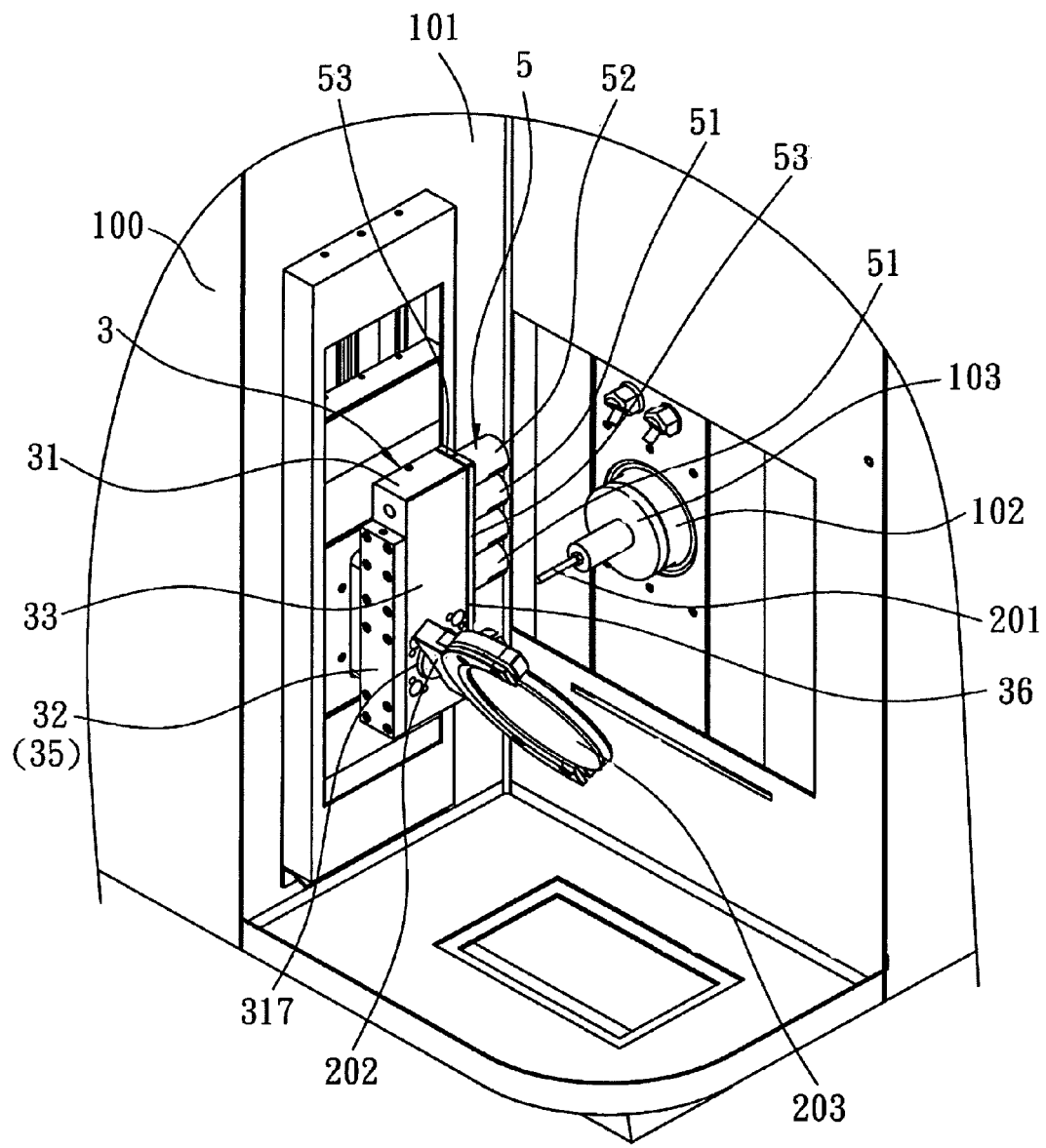
FIG. 2 is an enlarged view of a part of FIG. 1.
Figure 3:
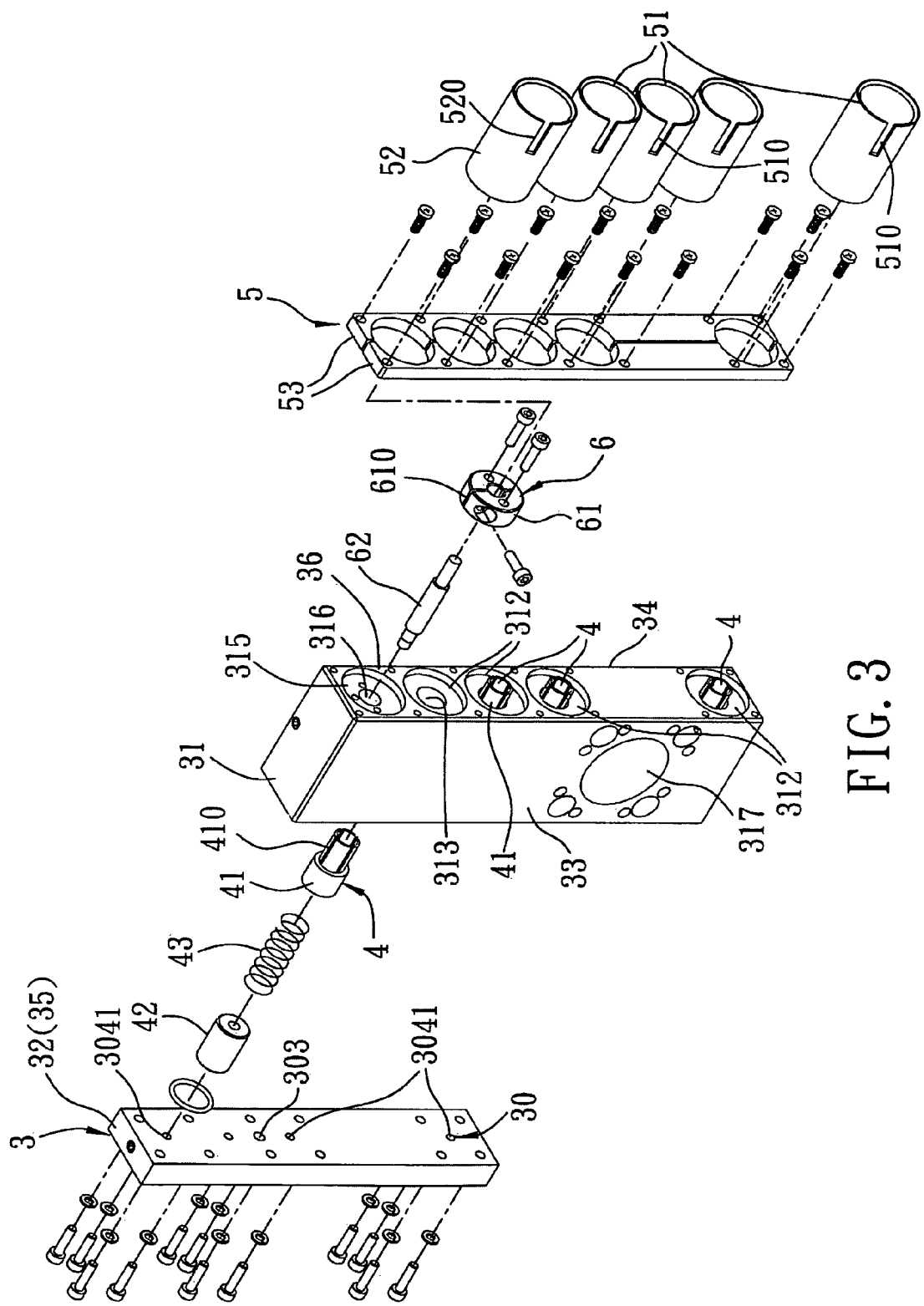
FIG. 3 is an exploded perspective view of the preferred embodiment.

Referring to FIGS. 1 and 2, the preferred embodiment of a tool magazine device according to the present invention is adapted to be mounted on a machine body 100 of a machine tool. The machine body 100 defines a working space 101. A tool spindle assembly, such as a robotic arm 102 is mounted in the machine body 100, extends into the working space 101, and has a tool spindle rotatable about a spindle axis oriented in a longitudinal direction, and having a tool holder 103. With reference to FIG. 3, the tool magazine of this embodiment comprises a magazine body 3, a plurality of gripping units 4, a hood unit 5, and a knife measuring unit 6.

Figure 4:
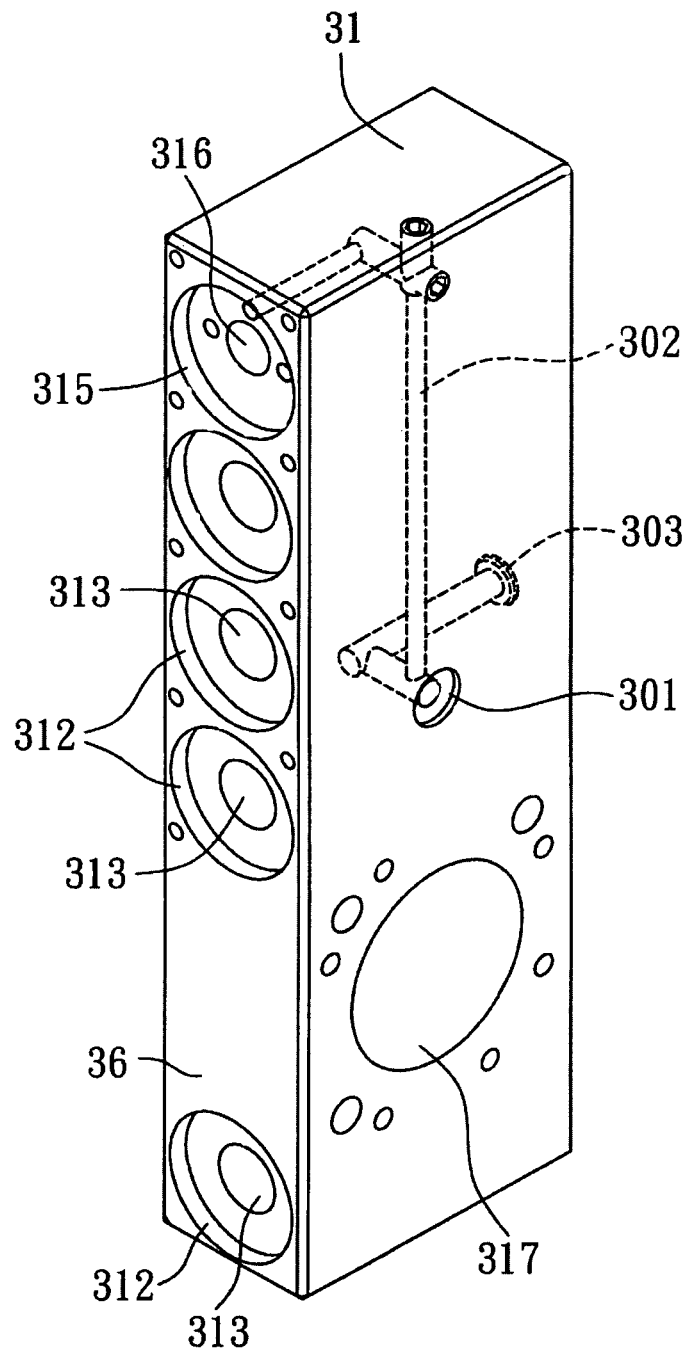
FIG. 4 is a perspective view of a magazine body of the preferred embodiment, taken from another angle.

Referring to FIGS. 2 to 4, the magazine body 3 is disposed on the machine body 100 to confront the working space 101 in a transverse direction transverse to the longitudinal direction. The magazine body 3 is constructed by a magazine housing 31 and a cover plate 32 securely mounted on a left side of the magazine housing 31. The magazine body 3 has an outer mounting wall 33 which is disposed to confront the working space 101 in the transverse direction, an inner mounting wall 34 which is opposite to the outer mounting wall 33 in the transverse direction, and left and right side walls 35, 36 which are opposite to each other in the longitudinal direction, and which are distal from and proximate to the tool spindle, respectively. The left side wall 35 is formed on the cover plate 32. The outer mounting wall 33 has a positioning hole 317 disposed to be adapted to retain a workpiece clamping device 202 for clamping a workpiece 203 to be cut.

Figure 5:
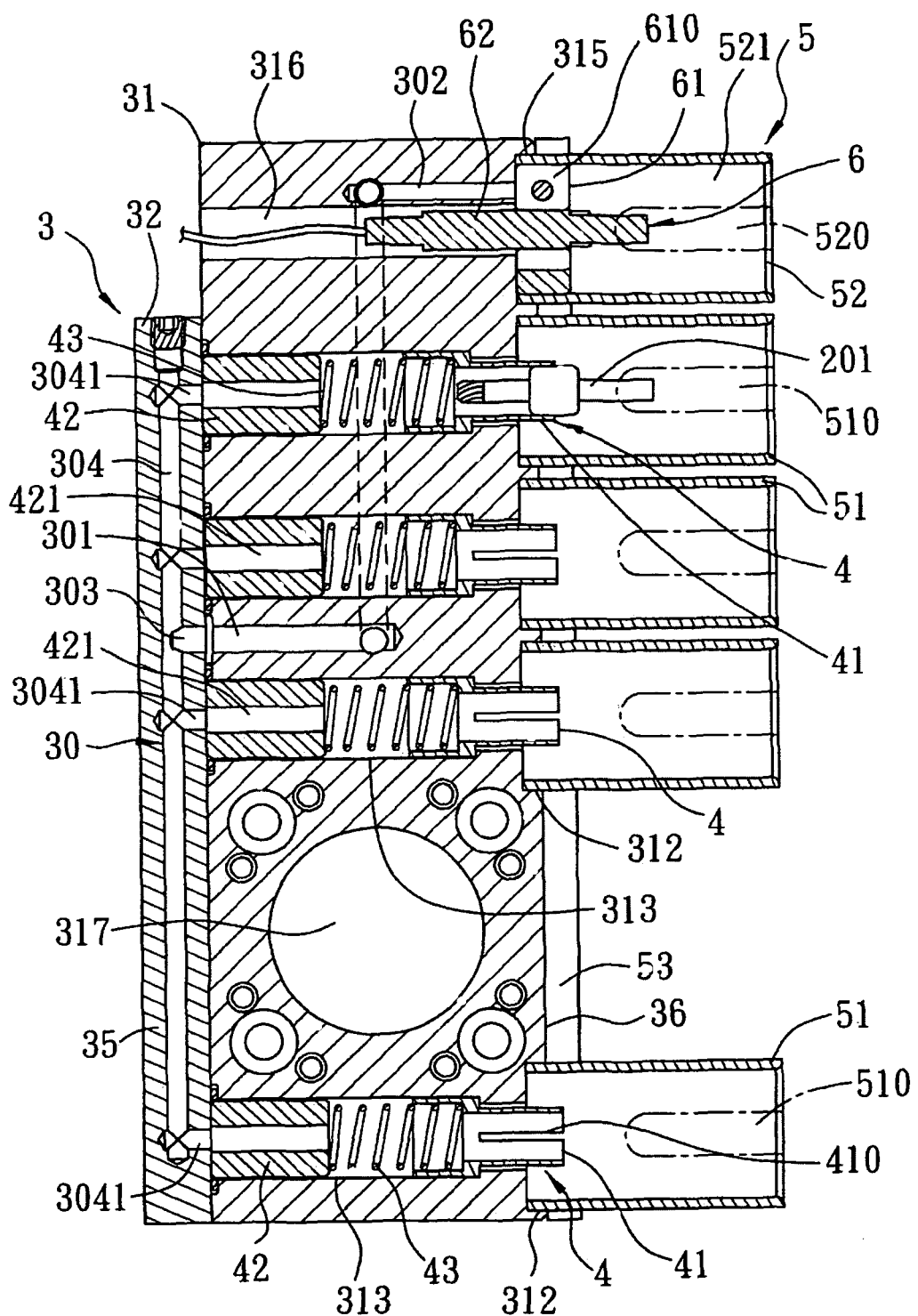
FIG. 5 is a sectional view of the preferred embodiment.

Referring to FIGS. 3 to 5, the right side wall 36 has a plurality of first insertion openings 312 which are displaced from each other in an upright direction, and each of which extends towards the left side wall 35 along an insertion axis to form a storage chamber 313, and a second insertion opening 315 which is disposed upwardly from the first insertion openings 312 and which extends toward the left side wall 35 to form a measurer receiving chamber 316. An inlet 301 is disposed in the magazine body 3 through the inner mounting wall 34 for introducing therein a flow of pressurized air from a pressurized air source (not shown). An air duct unit 30 is disposed on the left side wall 35 and is coupled to communicate the inlet 301 with the storage chambers 313. Specifically, the air duct unit 30 includes a communicating hole 303 which is formed in the left side wall 35 to communicate with the inlet 301, and an air conduit 304 which extends in the upright direction and which has a plurality of inlet ports 3041 disposed to communicate with the storage chambers 313, respectively. Further, the magazine body 3 further has a communicating passage 302 which extends in the longitudinal direction and which is configured to communicate the inlet 301 with the measuring receiving chamber 316. Accordingly, the pressurized air can flow out of the first and second insertion openings 312, 315.

The gripping units 4 are mounted in the storage chambers 313, respectively. Each of the gripping units 4 includes a tubular gripping member 41 which is configured to grippingly engage a cutting tool 201, and which is fitted in, and movable relative to the corresponding first insertion opening 312 between tightly and loosely engaging positions where the gripping member 41 is respectively distal from and proximate to the left side wall 35. An abutment 42 which is securely disposed in the corresponding storage chamber 313 is further supported by abutting against the cover plate 32. The abutment 42 has a communicating duct 421 extending to communicate with the corresponding inlet port 3041 so as to permit flow of the pressurized air into the storage chambers 313, and a biasing member 43 which is disposed between the gripping member 41 and the abutment 42 to bias the gripping member 41 toward the tightly engaging position. Further, the gripping member 41 extends rightwardly of the right side wall 36, and has a plurality of radially extending clearances 410 to permit flowing of the pressurized air therefrom even when the corresponding cutting tool 201 is held thereby.

The hood unit 5 includes a plurality of tubular hoods 51 respectively mounted at the first insertion openings 312, a measurer hood 52 disposed to be fitted in the second insertion opening 315, and a hood holding member 53 securely mounted on the right side wall 36 of the magazine body 3. Each of the tubular hoods 51 extends rightwardly of the right side wall 36 and defines an outlet path disposed downstream of the corresponding first insertion opening 312. Each of the tubular hoods 51 has a first lengthwise slit 510 to facilitate insertion or removal of the corresponding cutting tool 201 into or from the corresponding tubular hood 51. The measurer hood 52 extends rightwardly of the right side wall 36 to define a measuring chamber 521, and has a second lengthwise slit 520 to facilitate insertion or removal of the corresponding cutting tool 201 into or from the measurer hood 52. The hood holding member 53 is constructed by two plate halves configured to secure the tubular hoods 51 and the measurer hood 52 to the right side wall 36.

The knife measuring unit 6 includes a mounting member 61 which is retainingly mounted in the second insertion opening 315 and which extends into the measuring chamber 521 to be surrounded by the measurer hood 52, and a knife measuring member 62 which is received in the measurer receiving chamber 316 and which is held by the mounting member 61. The mounting member 61 has a plurality of radially extending clearances 610 disposed to communicate the communicating passage 302 with the measurer receiving chamber 316 so as to permit flow of the pressurized air over the knife measuring member 61. The knife measuring member 62 has a contact which extends in the measuring chamber 521 such that the contact gives out an electric signal when being brought in contact with a cutting tool held by the mounting member 61. Since the knife measuring member 62 is of a known type, detailed description on it is dispensed with herein.

Referring to FIGS. 2, 3 and 5, in use, the tool magazine device is mounted on the machine body 100 to confront the working space 101. The plurality of cutting tools 201 are set ready in the gripping members 41, respectively, and the workpiece clamping device 202 on which a workpiece 203 is clamped is mounted at the positioning hole 317. Sequentially, the tool spindle assembly 102 is moved to take up a predetermined cutting tool 201 gripped by the gripping member 41 horizontally out of the corresponding tubular hood 51 through the corresponding first lengthwise slit 510, thereby shortening the transport course for tool change of the tool spindle assembly 102.

During a cutting process, pressurized air can continuously flow through the first and second insertion openings 312, 315 through the air duct unit 30, and then streaming through the gripping members 41 and the mounting member 61. Further, each of the tubular hoods 51 and the measurer hood 52 can form a columnar flow of the pressurized air. Therefore, the columnar flowing of pressurized air can more effectively clean swarf from the cutting tools 201 so as to fend off undesirable entry of swarf into the tubular hoods 51 and the measurer hood 52. When the respective cutting tool 201 is to be inserted into the corresponding one of the gripping members 41 and the mounting member 61 after use, swarf adhered thereto can be removed by the flowing of pressurized air.

Further, with each of the gripping members 41 movable between the tightly and loosely engaging positions and the respective biasing member 43 disposed to bias the gripping member 41 to the tightly engaging position, cutting tools 201 of different lengths can be easily detached from the tool holder 103 of the tool spindle assembly 102 when being inserted into the corresponding gripping members 41.

Here, the tool spindle assembly 102 can proceed with the change of the cutting tools 201 without the need to open a cover (not shown) of the working space 101 as in the conventional machine tool, and swarf produced in a cutting process and adhered to a used cutting tool can be removed before storage thereof so as to prevent any swarf from entering into the tool magazine.

In this embodiment, since the positioning hole 317 is formed between two lower first insertion openings 312, the air duct unit 30 having the communicating hole 303 and the air conduit 304 is formed in the cover plate 32. Alternatively, the air duct unit 30 may be formed in the magazine housing 31. Moreover, the hood holding member 53 having two plate halves is disposed to detachably grip the tubular hoods 51 and the measurer hood 52 for facilitating replacement thereof. Alternatively, the tubular and measurer hoods 51, 52 may be affixed on the right side wall 36 by screws, adhesives, etc., and the hood holding member 53 may be dispensed with.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A tool magazine device for a machine tool capable of cleaning cutting tools immediately before storage thereof, the machine tool including a machine body defining a working space, a tool spindle rotatably mounted in the machine body, extending into the working space about a spindle axis, and having a tool holder, said tool magazine comprising:

a magazine body adapted to be disposed on the machine body to confront the working space, and having an outer mounting wall which is disposed to confront the working space, and an inner mounting wall which is opposite to said outer mounting wall, and left and right side walls which are distal from and proximate to the tool spindle, respectively, said right side wall having a plurality of first insertion openings which are displaced from each other, and each of which extends towards said left side wall along an insertion axis to form a storage chamber that terminates at an abutment;

an inlet disposed in said magazine body for introducing therein a flow of pressurized air; and an air duct unit disposed on said left side wall and coupled to communicate said inlet with said storage chamber so as to permit the pressurized air to flow out of a corresponding one of said first insertion openings to thereby clean swarf from a corresponding one of the cutting tools when the cutting tool is inserted into the corresponding one of said first insertion openings after the insertion axis of the corresponding one of said first insertion openings is brought into alignment with the spindle axis.

2. The tool magazine device according to claim 1, wherein said first insertion openings are displaced from each other in an upright direction.

3. The tool magazine device according to claim 2, wherein said abutment has a communicating duct which extends to communicate with said left side wall, said air duct unit including an air conduit which extends in the upright direction to communicate with said communicating duct so as to permit flow of the pressurized air into said storage chambers.

4. The tool magazine device according to claim 3, further comprising:
   a plurality of gripping members, each being configured to grippingly engage the corresponding one of the cutting tools, and being fitted in, and movable relative to a respective one of said first insertion openings between tightly and loosely engaging positions where said gripping member is respectively distal from and proximate to said abutment; and
   a plurality of biasing members, each being disposed between a respective one of said gripping members and said abutment to bias said gripping member toward the tightly engaging position.

5. The tool magazine device according to claim 1, further comprising a plurality of tubular hoods, each extending rightwardly from said right side wall and defining an outlet path that is disposed downstream of a respective one of said first insertion openings so as to form a columnar flow of the pressurized air for more effectively cleaning swarf from the corresponding cutting tool in the vicinity of said first insertion openings.

6. The tool magazine device according to claim 5, wherein each of said tubular hoods has a first lengthwise slit to facilitate insertion or removal of the corresponding cutting tool into or from a corresponding one of said tubular hoods.

7. The tool magazine device according to claim 5, wherein said right side wall further has a second insertion opening which extends toward said left side wall to form a measurer receiving chamber, said tool magazine device further comprising a knife measuring member disposed in said measurer receiving chamber and having a contact which extends outwardly of said second insertion opening such that said contact gives out an electric signal when being brought in contact with a cutting tool.

8. The tool magazine device according to claim 7, further comprising:
   a mounting member which is retainingly mounted in said second insertion opening and which is configured to hold said knife measuring member; and
   a measurer hood which is disposed to surround said mounting member and which extends rightwardly from said right side wall to define a measuring chamber for receiving said contact of said knife measuring member therein;
   said magazine body further having a communicating passage which is configured to communicate said inlet with said measuring chamber.

9. The tool magazine device according to claim 8, wherein said mounting member has a plurality of radially extending clearances disposed to communicate said communicating passage with said measurer receiving chamber so as to permit flow of the pressurized air over said knife measuring member.

10. The tool magazine device according to claim 8, wherein said measurer hood has a second lengthwise slit to facilitate insertion or removal of the corresponding cutting tool into or from said measurer hood.

11. The tool magazine device according to claim 8, further comprising a hood holding member which is securely mounted on said right side wall of said magazine body and which is configured to secure said tubular hoods and said measurer hood to said right side wall.

12. The tool magazine device according to claim 1, wherein said outer mounting wall has a positioning hole disposed to be adapted to retain a workpiece clamping device.

* * * * *